Figure 1:
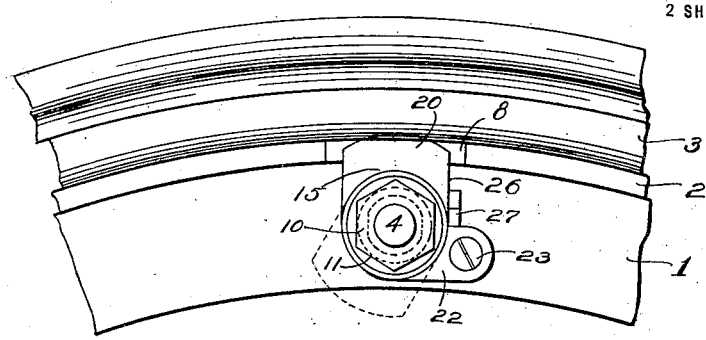

R. S. BRYANT.
RIM CLAMP.
APPLICATION FILED MAY 6, 1912.

1,177,601.

Patented Apr. 4, 1916.
2 SHEETS—SHEET 1.

Witnesses:

Inventor
Richard S. Bryant
By Hull & Smith
Attys.

R. S. BRYANT.
RIM CLAMP.
APPLICATION FILED MAY 6, 1912.

1,177,601.

Patented Apr. 4, 1916.
2 SHEETS—SHEET 2.

Witnesses:
Chas. Abbott
Brennan W. West

Inventor
Richard S. Bryant,
By Hill & Smith,
Attys.

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM-CLAMP.

1,177,601.  Specification of Letters Patent.  Patented Apr. 4, 1916.

Application filed May 6, 1912.  Serial No. 695,413.

*To all whom it may concern:*

Be it known that I, RICHARD S. BRYANT, a citizen of the United States, residing at Cleveland, in the county of Cuyahoga and State of Ohio, have invented a certain new and useful Improvement in Rim-Clamps, of which the following is a full, clear, and exact description, reference being had to the accompanying drawings.

This invention relates to clamps whereby a demountable rim may be secured upon the felly of a vehicle wheel and has for its particular object the provision of a clamp which may be operated with the smallest possible number of manual movements.

The use of a demountable rim upon a vehicle wheel for the purpose of facilitating tire repairs is already wide spread and these rims are generally secured in place by means of clamping members attached to the felly and engaging either the side of the rim, or the side of a wedge member interposed between the rim and the felly. These clamps have generally comprised a bolt secured in the felly, a clip secured in place by the bolt and engaging the rim or wedge member, and a nut for holding the clip in place. The operation of disengaging such a clamp has involved the removal or loosening of the nut and the subsequent and independent removal, shifting, or turning of the clip so as to displace it out of engagement with the felly-surrounding member. It has heretofore been suggested to secure the clip and nut permanently together so that the two might not become disengaged, thus preventing their loss or misplacement, particularly when it became necessary to remove the rim under emergency conditions as in a muddy road or at night, but such expedients have been only partially successful, have frequently necessitated a complicated and unreliable structure, have proven expensive in construction and assembling, have put an undue strain upon the parts, and have required to be made with such exactness as to become useless in case the rim or felly should vary from the normal size except by the very smallest amount.

The object of the present invention is the provision of a clamp of this nature which can be cheaply manufactured and easily assembled; the provision of a clamp which shall hold the parts securely together even although the same may vary considerably in size, and this without placing any unnecessary or undue strains upon the parts; the provision of a device of this nature wherein the strains shall fall in the direction in which they can most easily be sustained; the provision of a device wherein the loosening of the clamp shall automatically displace the clip or rim-retaining member out of obstructing position, and in which the returning movement of the clamp parts toward operative position shall automatically return said rim-retaining member to its obstructing position, this result being effected irrespective of the relative positions of the said rim-retaining member and the other parts of the clamp; the provision of a device of this character wherein the opportunities for loss or breakage of the parts shall be at a minimum; while further objects and advantages of the invention will become apparent from the following description and claims.

Figure 2:
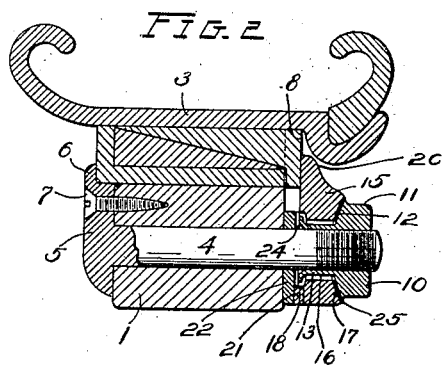
Figure 3:
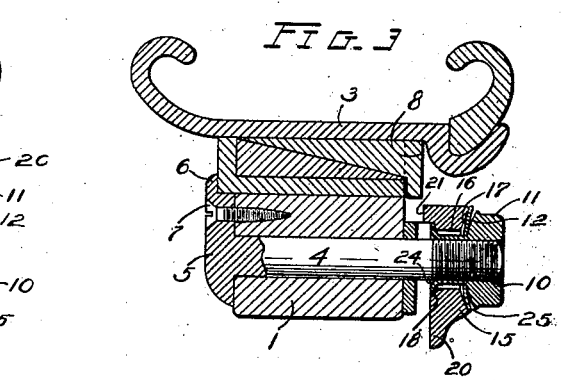
Figure 4:
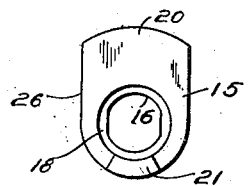
Figures 5, 6:
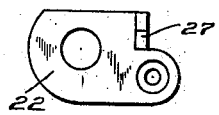
Figure 7:
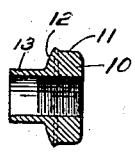
Figure 8:
Figure 9:
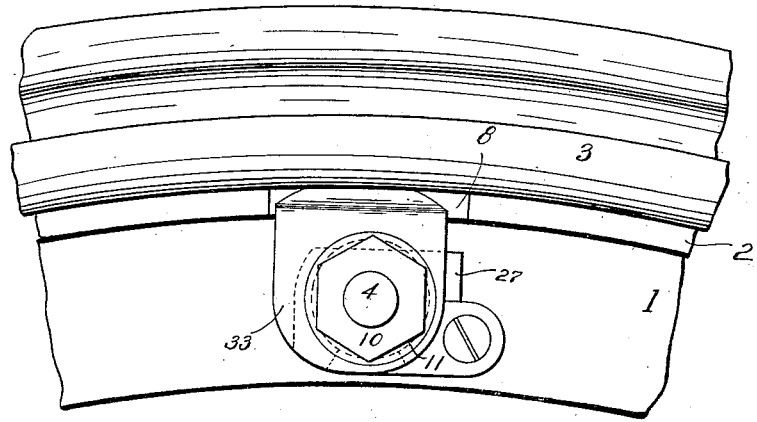
Figure 10:
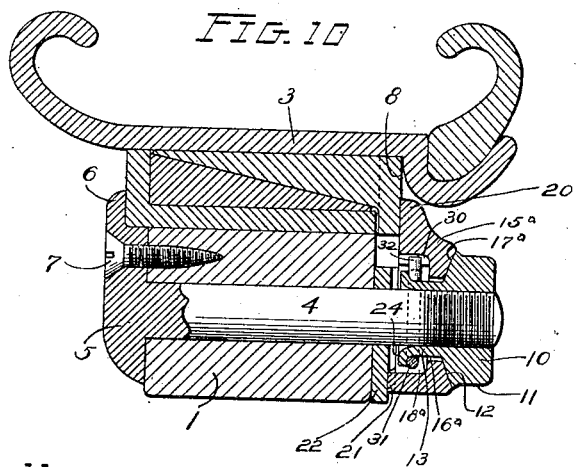
Figure 11:
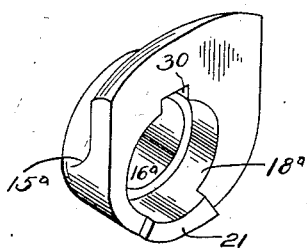
Figure 12:
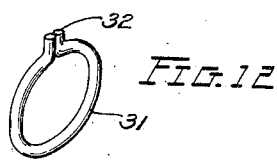

Generally speaking my invention may be defined as consisting of the combinations of elements recited in the claims hereto annexed and illustrated in the drawings accompanying and forming part of this application, wherein:

Figure 1 represents in side elevation, a portion of a vehicle wheel having a demountable rim and provided with my improved rim clamp; Fig. 2 is a transverse cross sectional view of the same taken through the center of said clamp and illustrating the same in operative position; Fig. 3 is a view similar to Fig. 2 showing the clamp in disengaged or inoperative position; Fig. 4 is an elevation of the clip as viewed from the inside, that is from the left in Figs. 2 and 3; Fig. 5, an edge view of the felly plate; Fig. 6, a face view of the felly plate; Fig. 7 a cross sectional view through the nut prior to its connection to the clip; and Fig. 8 a perspective view of the elastic friction washer. Fig. 9 represents in perspective a portion of a felly and demountable rim equipped with a modified form of clamp; Fig. 10 is a transverse cross sectional view through the center of the rim and clamp shown in Fig. 9; Fig. 11 is a perspective view of the clip illustrated in Figs. 9 and 10; and Fig. 12 is a perspective view of the friction member employed therewith.

Describing the parts by reference characters, 1 represents the felly of a wheel, 2 the felly band surrounding the same, and 3 the demountable rim embracing said felly band. In this application I have illustrated a demountable rim of the type disclosed in my copending application filed April 25, 1912, Ser. No. 693,080; although it is to be understood that this rim is chosen for purposes of illustration only and that the clip which is the subject of this application may and will be used in any case wherein it is desired to retain a demountable rim of any type against lateral displacement from a felly. Secured in the felly at intervals about its circumference are bolts 4, only one of which is illustrated in these drawings although the number, arrangement, and use of the same will be familiar to any person skilled in the art. These bolts are preferably positioned with their axes substantially normal to the plane of the wheel and preferably have heads 5 overlapping the rearward side of the felly band as at 6, the forward threaded ends of the bolts projecting through the felly at the outer side of the wheel. Rotation of these bolts is prevented by their engagement with the felly band, while longitudinal movement thereof tending to back them out of the felly may be prevented in any one of several ways, as by screws 7 traversing the heads and engaging the body of the felly. Adjacent to each of the bolts 4 the felly-surrounding member is formed with a laterally facing shoulder 8 for the engagement of the rim retaining member of the clamp, but whether these shoulders are discontinuous as illustrated in this application, or are continuous as is the case in many constructions now widely used, is entirely immaterial to the present invention. Furthermore this felly surrounding member may be either a rim or a wedge ring interposed between the felly and rim, and this specification and claims have been framed with this in view. Upon the threaded end of each of these bolts I mount a nut 10 having a prismatic wrench engaging portion 11 and a convex shoulder 12 in the rear of such prismatic portion. Said nut is also formed with an integral annular flange or sleeve 13 projecting inwardly and surrounding the threaded aperture therethrough, said flange or sleeve being originally made straight and cylindrical as shown in Fig. 7 and later flared outwardly to interlock with my improved clip. This clip is indicated generally by 15 and consists of a metallic block of plate-like form having therethrough an aperture 16 whose inner end is counter-bored at 18 and whose outer end merges with a concave recess 17 of substantially the same curvature as the shoulder 12, so as to present opposed faces of ball-and-socket form. The aperture 16 is preferably slightly elongated, as shown in Fig. 4, so as to render the clip capable of rocking movement relatively to the nut, for a purpose to be hereafter described, the diameter of the narrowest part of said aperture being sufficient to receive the sleeve 13. The body of the clip is formed at one side with a projecting portion or toe 20 adapted to engage the shoulder 8 of the rim or other felly-surrounding member, and at the opposite side with a forward projection or heel 21 adapted to engage a metallic plate 22 carried by the felly. This plate is apertured for the reception of the bolt 4 and is fixedly secured to the side of the felly by a screw 23 or the like. The toe 20 and heel 21 are formed upon opposite sides of the aperture 16 and are in line with the major axis of said aperture.

In assembling, the sleeve 13 is passed through the aperture 16 and expanded or flared as at 24, into the recess 18, a substantially flat annular washer 25 of elastic material being introduced between the shoulder 12 and recess 17 so as to become distorted by the pressure into concavo-convex form. The oblong shape of the aperture 16 taken together with the rounding surfaces of the shoulder 12 and recess 17 permit a considerable amount of rocking movement of the clip relative to the bolt, so that after the heel 21 has become seated against the plate 22, the toe 20 can still move forward a considerable distance so as to press forcibly against the shoulder 8 even though the position of this shoulder should vary considerably for different rims. For the same reason, the flared portion 24 of the sleeve is preferably spaced a sufficient distance from the shoulder 12 so as not to bind the clip tightly therebetween, although the parts should be held with sufficient tightness so as to maintain the washer 25 always under some tension as shown in Fig. 3.

The right hand side of the clip is preferably made straight as at 26, and the plate 22 is formed with an outwardly projecting abrupt ear 27 adapted to be engaged by said clip when the same has been brought to the position necessary to cause the toe 20 to engage the rim. With this construction it will be seen that if a wrench, such as the socket or bit stock wrench ordinarily employed for this purpose, be applied to the nut 10 and the latter rotated so as to unscrew the same, in this instance toward the left, a time will soon be reached when the friction between the washer 25 and the surfaces against which it engages will become greater than the friction between the toe 20 and shoulder 8, whereupon, if there be no shoulders or other obstructions at the left hand side of the clip, the clip will be rotated in a counter-clockwise direction so as to remove the toe 20 from obstructing position. By obstructions at the left hand side of the clip is meant the possible projection of the felly band at the side of the notch here shown, or any other shoulder which might impede the rotation of the clip. Whatever projections there be, the clip will obviously rotate as soon as it has been drawn outwardly a sufficient distance to permit it to pass by the same, although in no case can it rotate more than about three-quarters of a turn when it will be stopped by the ear 27. Obviously its rotation could be limited to a smaller amount than this but such limitation is not necessary. Likewise if a left-hand thread were employed the ear 27 would be disposed at the left-hand side of the clip. When it is desired to replace the clip, the nut 10 is merely rotated in the opposite direction from that which was required to release it, the first effect of such rotation being to return the clip to obstructing position, whereupon it will be seated by the action of the nut, its further rotation being prevented by the ear 27.

The oblong shape of the aperture 16 is not imperative since the aperture could be made of sufficient size in all directions to permit the necessary rocking of the clip, but the added thickness of metal at the sides of the aperture gained by making the aperture oblong adds greatly to the strength of the device by adding metal at the point of greatest weakness.

In Figs. 9 to 12, I have illustrated a slightly modified form of my improved clamp, although the general mode of operation is exactly the same as that of the device above described. In these figures the parts 1 to 13 inclusive are exactly the same as those previously described and the clip 15<sup>a</sup> is exactly like the clip 15 excepting that the counterbore 18<sup>a</sup> is made considerably deeper than before with a corresponding decrease in the length of the aperture 16<sup>a</sup>, the wall of this counterbore being formed at one point with a notch 30. The outer end of the aperture 16<sup>a</sup> merges with a spherical socket 17<sup>a</sup> as before, while the clip is formed with the same toe 20 and heel 21. In this embodiment, however, the spring washer 25 is omitted, the shoulder 12 seating immediately within this socket, and in place of the washer a circular spring wire ring 31 is sprung about the sleeve 13, said ring having outturned ends 22 received in the recess 30. The end of the sleeve 13 is flared outwardly as at 24, and the felly is provided with a plate 22 similar to that used in the preceding modification. The normal inner diameter of the ring 31 is slightly less than the exterior diameter of the sleeve 13 so that the effect of the friction between these parts is to cause the clip to tend to follow the movement of the nut in the same manner as before. In this embodiment I have illustrated the aperture 16<sup>a</sup> as circular, and have gained an equivalent amount of strength by the addition of extra metal at the side of the clip as shown at 33.

The modified constructional form of my improved clip illustrated in Figs. 9 to 12 and just described above will be found specifically claimed in my co-pending application filed May 27, 1912, Serial No. 699,929, the present case being restricted in its specific aspects to the first described form of clip, viz., that illustrated in Figs. 1 to 8.

While I am aware that it has heretofore been proposed to swivel a clip or rim-engaging member permanently to a nut so as to prevent their separate loss and to avoid the necessity of removing the nut entirely from its bolt when it is desired to dismount the rim, I am not aware that any person prior to my invention has introduced a continuously-operating friction element between these parts so as automatically to rotate said clip or tire-engaging member into and out of its operative position merely by the rotation of the nut. Likewise, I am not aware that any construction whereby a universal joint connection could be employed between this nut and clip has ever been proposed, but a serious disadvantage of previously known devices has been their rigidity which has greatly limited the scope of their usefulness and has invariably thrown an undue bending strain upon the bolt.

While I have described my improved clamp in connection with a wheel rim, and while I apprehend that its main employment will be in this connection, I realize that it may be found of use in other relations, such as the clamping of manholes, doors, receptacle covers and the like, wherefore I do not confine myself to the use here illustrated and described. Likewise, while I have necessarily described the invention in detail and particularly pointed out the features of construction and arrangement of parts which result in the most satisfactory and practical construction with which I am at present familiar, I do not limit myself to such details except as the same may be positively included in the claims hereto annexed or may be rendered necessary by the prior state of the art.

Having thus described my invention, what I claim is:

1. The combination with a wheel and a demountable rim therefor; of means for securing said rim in place on said wheel, said means including a threaded member on said wheel, a second threaded member engaging said first member so as to be movable toward and from the side of said wheel upon being rotated, a clip rotatably mounted on said second member, said clip having a smooth bearing on said member and being adapted in one angular position to coöperate with said rim, means frictionally connecting said clip and second member, whereby the former tends to rotate with the latter, and means on said wheel adapted to inter-engage with said clip and restrain rotation thereof.

2. The combination with a wheel and a demountable rim therefor; of means for securing said rim in place on said wheel, said means including a threaded member on said wheel, a second threaded member engaging said first member so as to be movable toward and from the side of said wheel upon being rotated, a clip rotatably mounted on said second member, said clip having a smooth bearing on said member and having a lateral projection adapted in one angular position to coöperate with said rim, independent means frictionally connecting said clip and second member, whereby the former tends to rotate with the latter, and means on said wheel adapted to inter-engage with said clip to limit rotation thereof from such operative position to an inoperative position, and vice versa.

3. The combination with a wheel and a demountable rim therefor; of means for securing said rim in place on said wheel, said means including a threaded member on said wheel, a second threaded member engaging said first member so as to be movable toward and from the side of said wheel upon being rotated, said second member having a rounded inwardly facing shoulder, and a clip permanently swiveled upon said second member and having a rounded face complementary to such shoulder, whereby said clip may rock with respect to said second member, said clip being adapted in one angular position to coöperate with said rim.

4. The combination with a wheel and a demountable rim therefor; of means for securing said rim in place on said wheel, said means including a threaded member on said wheel, a second threaded member engaging said first member so as to be movable toward and from the side of said wheel upon being rotated, said second member having a convex inwardly facing shoulder, and a clip permanently swiveled upon said second member and having a concave face complementary to such shoulder, whereby said clip may rock with respect to said second member, said clip having a lateral projection adapted in one angular position to coöperate with said rim.

5. The combination with a wheel and a demountable rim therefor; of means for securing said rim in place on said wheel, said means including a threaded member on said wheel, a second threaded member engaging said first member so as to be movable toward and from the side of said wheel upon being rotated, said second member having a rounded inwardly facing shoulder, a clip permanently swiveled upon said second member and having a rounded face complementary to such shoulder, whereby said clip may rock with respect to said second member, said clip being adapted in one angular position to coöperate with said rim, means frictionally connecting said clip and second member, whereby the former tends to rotate with the latter, and means on said wheel adapted to inter-engage with said clip and restrain rotation thereof.

6. The combination with a wheel and a demountable rim therefor; of means for securing said rim in place on said wheel, said means including a threaded member on said wheel, a second threaded member engaging said first member so as to be movable toward and from the side of said wheel upon being rotated, said second member having a convex inwardly facing shoulder, a clip permanently swiveled upon said second member and having a concave face complementary to such shoulder, whereby said clip may rock with respect to said second member, said clip having a lateral projection adapted in one angular position to coöperate with said rim, means frictionally connecting said clip and second member, whereby the former tends to rotate with the latter, and means on said clip wheel adapted to inter-engage with said clip to limit rotation thereof from such operative position to an inoperative position, and vice versa.

7. The combination with a wheel and a demountable rim therefor; of means for securing said rim in place on said wheel, said means including a threaded member on said wheel, a second threaded member engaging said first member so as to be movable toward and from the side of said wheel upon being rotated, said second member having a pair of spaced shoulders, and a clip rotatably mounted on said second member between such shoulders and adapted in one angular position to coöperate with said rim, the opposed faces of said clip and the outermost of such shoulders being complementarily rounded.

8. The combination with a wheel and a demountable rim therefor; of means for securing said rim in place on said wheel, said means including a threaded member on said wheel, a second threaded member engaging said first member so as to be movable toward and from the side of said wheel upon being rotated, said second member having a pair of spaced shoulders, and a clip rotatably mounted on said second member between such shoulders and having a lateral projection adapted in one position to coöperate with said rim, the opposed faces of said clip and the outermost of such shoulders being complementarily concave and convex, respectively.

9. The combination with a wheel and a demountable rim therefor; of means for securing said rim in place on said wheel, said means including a threaded member on said wheel, a second threaded member engaging said first member so as to be movable toward and from the side of said wheel upon being rotated, said second member having a pair of spaced shoulders, a clip rotatably mounted on said second member between such shoulders and adapted in one angular position to coöperate with said rim, the opposed faces of said clip and the outermost of such shoulders being complementarily rounded, a spring washer interposed between, and frictionally engaging, such faces, whereby said clip tends to rotate with said second member, and means on said wheel adapted to interengage with said clip and restrain rotation thereof.

10. The combination with a wheel and a demountable rim therefor; of means for securing said rim in place on said wheel, said means including a threaded member on said wheel, a second threaded member engaging said first member so as to be movable toward and from the side of said wheel upon being rotated, said second member having a pair of spaced shoulders, a clip rotatably mounted on said second member, between such shoulders and having a lateral projection adapted in one position to coöperate with said rim, the opposed faces of said clip and the outermost of such shoulders being complementarily concave and convex, respectively, a spring washer interposed between, and frictionally engaging, such faces, whereby said clip tends to rotate with said second member, and means on said wheel adapted to inter-engage with said clip to limit rotation thereof from such operative position to an inoperative position, and vice versa.

11. In a device of the character described, the combination, with a bolt and a nut working thereon, of a clip universally swiveled to said nut, a continuously acting friction device interposed between said clip and nut and tending to cause said clip to accompany the rotation of said nut, and means limiting the rotation of said clip.

12. In a device of the character described, the combination with a bolt and a nut working thereon, of a clip loosely pivotally attached to said nut so as to have a rocking movement thereon, a spring member interposed between said clip and nut and frictionally securing the same together, whereby relative rotation between the same is normally prevented; and a stop disposed to engage and limit the rotation of said clip in both directions.

13. In a device for detachably securing an annular member about a circular member, the combination, with a bolt projecting laterally from said circular member and a nut working thereon, of a clip for engaging said annular member swiveled to said nut and normally rotatable therewith, stop means limiting the rotation of said clip when in position to engage said annular member and when in position to leave said annular member free, respectively, and a friction device interposed between said nut and clip and tending at all times to cause said clip to follow the rotation of said nut.

14. The combination with a wheel and a demountable rim therefor; of means for securing said rim in place upon said wheel, said means including a bolt projecting laterally from said wheel, a nut threaded on said bolt, a clip permanently rotatably attached to said nut and also capable of rocking movement with respect thereto, and means tending to hold said clip against rotation on said nut.

15. The combination with a wheel and a demountable rim therefor; of means for securing said rim in place upon said wheel, said means including a bolt projecting laterally from said wheel, a nut threaded on said bolt, a clip permanently rotatably attached to said nut and also capable of rocking movement with respect thereto, and resilient means carried with and frictionally connecting said clip and nut.

16. The combination with a wheel and a demountable rim therefor; of means for securing said rim in place upon said wheel, said means including a bolt projecting laterally from said wheel, a nut threaded on said bolt, and a clip permanently rotatably attached to said nut and also capable of rocking movement with respect thereto, said clip and nut having opposed faces of ball-and-socket form.

17. The combination with a wheel and a demountable rim therefor; of means for securing said rim in place upon said wheel, said means including a bolt projecting laterally from said wheel, a nut threaded on said bolt, a clip permanently rotatably attached to said nut and also capable of rocking movement with respect thereto, said clip and nut having opposed faces of ball-and-socket form, and resilient means carried with and frictionally connecting said clip and nut.

18. The combination with a wheel and a demountable rim therefor; of means for securing said rim in place upon said wheel, said means including a bolt projecting laterally from said wheel, a nut threaded on said bolt, a clip rotatably attached to said nut and also capable of rocking movement with respect thereto, said clip and nut having opposed faces of ball-and-socket form, and a spring washer interposed between, and frictionally engaging, such faces.

19. The combination with a wheel and a demountable rim therefor; of means for securing said rim in place upon said wheel, said means including a bolt projecting laterally from said wheel, a nut threaded on said bolt and formed with oppositely facing shoulders one such shoulder being rounded, and a clip rotatably surrounding said nut between such shoulders and also capable of rocking movement with respect to said nut, said clip having a complementary face opposed to the rounded shoulder of said nut.

20. The combination with a wheel and a demountable rim therefor; of means for securing said rim in place upon said wheel, said means including a bolt projecting laterally from said wheel, a nut threaded on said bolt and formed with oppositely facing shoulders, one such shoulder being convex, a clip rotatably surrounding said nut between such shoulders and also capable of rocking movement with respect to said nut, said clip having a concave face opposed to the convex shoulder of said nut, and a spring washer interposed between, and frictionally engaging, such face and shoulder.

In testimony whereof, I hereunto affix my signature in the presence of two witnesses.

RICHARD S. BRYANT.

Witnesses:
J. B. HULL,
H. B. McGILL.

Copies of this patent may be obtained for five cents each, by addressing the "Commissioner of Patents, Washington, D. C."